W. TURNBULL.
SELF LAYING TRACK VEHICLE.
APPLICATION FILED DEC. 11, 1916.
1,379,323.
Patented May 24, 1921.
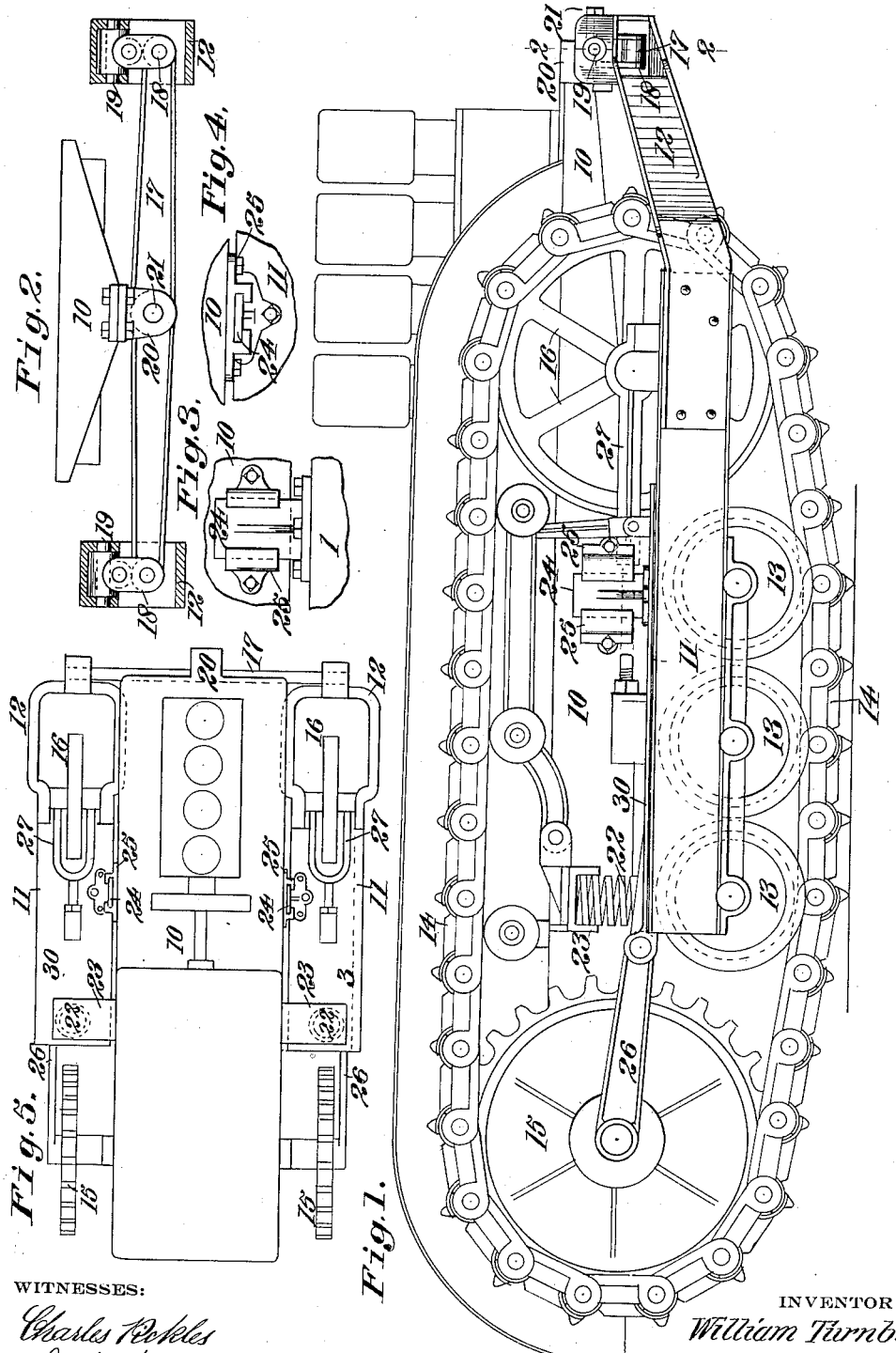
WITNESSES:
Charles Pickeles
J. H. Herring
INVENTOR
William Turnbull
BY Strong & Townsend
ATTORNEYS

UNITED STATES PATENT OFFICE.

WILLIAM TURNBULL, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-LAYING-TRACK VEHICLE.

1,379,323.  Specification of Letters Patent.  Patented May 24, 1921.

Application filed December 11, 1916. Serial No. 136,209.

*To all whom it may concern:*

Be it known that I, WILLIAM TURNBULL, a citizen of the United States, residing at Stockton, in the county of San Joaquin and State of California, have invented new and useful Improvements in Self-Laying-Track Vehicles, of which the following is a specification.

This invention relates to self-laying track vehicles; and has for its object to simplify and improve the construction and operation of the same.

The present design is ideally adapted for small, light and inexpensive tractors and comprises a novel and improved three-point supporting connection between the truck mechanism and the main frame.

One form which my invention may assume is exemplified in the following description and illustrated in the accompanying drawings, in which—

Figure 1 shows a side elevation of a tractor embodying my invention.

Fig. 2 shows a sectional view of the same on the line 2—2 of Fig. 1.

Figs. 3 and 4 show detail views of the vertically slidable connection between the truck mechanism and the main frame.

Fig. 5 shows a plan view, in diagram, of the complete tractor omitting the track belts.

In the device shown, a main frame 10 is supported at either side upon a roller truck mechanism, comprising a longitudinal truck frame 11 having a forwardly and upwardly inclined looped extension 12 terminating in line with the extreme front end of the main frame. The truck frame 11 carries, near its rear end, a series of flanged rollers 13 which operate upon an endless, flexible track 14, the latter running around a rear driving sprocket wheel 15, journaled directly upon the main frame, and a front blank idler wheel 16, journaled upon the truck frame 11. The front ends of the opposite truck frame extensions 12 are joined by an equalizer preferably a bar 17 which has links 18 connecting with said extensions by means of gimbal joints 19. Centrally upon the equalizer bar is a bifurcated member 20, pivotally connected thereto by means of a fore and aft pin 21, said bifurcated member being secured to the front end of the main frame and constituting the sole support for this portion of the frame.

The rear end of each truck frame carries a compressible helical spring 22, upon which rests the rear end of the main frame by means of outstanding channels 23 seated upon the springs. Thus there are two supports, one at either side, for the rear of the main frame, which, with the single support at the front, constitute a three-point suspension capable of great flexibility.

To retain the truck frames in alinement with the main frame and support them against side tipping, and at the same time allow for the yielding spring action of each truck with respect to the main frame, I connect each truck with the main frame by means of a short standard 24 affixed to the truck and working in a slide or keeper 25 secured to the main frame. The bearing of the standards 24 and the slides 25 are sufficiently loose to support the trucks and at the same time not interfere with their necessary freedom of movement.

Pivoted on the shaft of the driving sprocket wheel 15 is a swinging thrust bar 26 connecting pivotally and loosely with the adjacent truck frame, whereby to position and permit vertical movement of the latter. An adjustable forked push rod 27 is preferably included in the connection between the truck frame 11 and the idler wheel for the purpose of taking up slack in the belt as occasion requires.

The trucks 11 may be of any appropriate design. In practice they are preferably made of side channel members with the cast yoke 12 at the front end embracing the front or blank sprocket, or idler 16; the side members being connected rearwardly by a heavy metal plate 30 forming a bridge and also a support for the guide studs 24, and a seat for the springs 22.

I thus provide, in connection with a three-point suspension, a rigid, unjointed truck frame of great simplicity and economy of construction which has the desired yielding movements to clear obstructions without transmitting vibratory movements to the main frame. It will be noted that the movement of the truck frame is not the customary rocking one, but rather a bodily vertical movement, the tendency to rock being restrained by the sliding connections 24 and 25. The links 18 and the equalizer bar permit the front ends of the truck frames to move upwardly, independently of the main frame. The truck frames are well supported laterally despite the nature of their connection with the equalizer bar and the yielding character of the rear connection with the main frame.

This construction has been particularly designed for use in very small self-laying track tractors intended to operate in orchards and vineyards, or wherever it is necessary or desired to have a tractor of minimum dimensions and maximum power and efficiency; such a tractor being distinguished from the larger tractors represented for example by that illustrated in my copending case Serial No. 1766, filed January 12, 1915, in which the three-point suspension is claimed broadly.

The machine of case Serial No. 1766 is of such size that it is usual to embody the spring suspension means, and the three-point suspension in the space between the sprockets; the length of the trucks and the space between the sprockets being sufficient to insure stability.

In the present case however, while the machine is actually built not the exceed seven feet, four and one-half inches in length, and the space between the front and rear sprockets 15—16 is reduced, it is necessary to carry the truck 11 forward and around the front or blank sprocket 16 and connect by the equalizing bar 17, or equivalent means, with the front end of the machine. The equalizing bar 17 affords not only a yielding single point support for the load, but also a connector and spacing member for the two trucks; these trucks having no other connections with each other. By yieldingly supporting the main frame on the truck at points forward and rearward of the front sprocket 16, the desired degree of stability is afforded to the main frame upon the trucks and track and at the same time without sacrificing the desired cushioning action of the main frame.

Various changes in the construction and arrangement of the several parts may be employed without departing from the spirit of my invention as disclosed in the appended claims.

Having thus described my invention, what I claim and desire to secure by Letters Patent is—

1. In a vehicle, the combination of a main frame, an endless flexible self-laying track on each side of the main frame, a truck frame within each track provided with rollers bearing on the ground run of its respective track, rear driving sprockets and corresponding front idlers around which the tracks pass, said front idlers being mounted on the trucks, said trucks having a forward extension beyond the idlers, means connected centrally to the forward end of the main frame and to said forward truck extension for equally distributing the weight of that end of the main frame on each of the trucks, and load supporting connections between the opposite end of the trucks and main frame.

2. In a vehicle, the combination of a main frame, a flexible, endless track member at each side of the frame, a rigid truck frame carrying rollers bearing upon the bottom run of each track, springs between the main frame and the rear end of each truck frame, and a cross-bar centrally pivoted to the main frame and flexibly connected at its ends to the front ends of the truck frames at opposite sides, whereby the main frame is given a three-point bearing on the track members.

3. The combination with a vehicle frame, of a pair of endless, flexible track members arranged on opposite sides thereof, and a truck mechanism for each track comprising anti-friction members to engage the bottom run of the track and an unjointed frame therefor, the rear end of the vehicle frame being supported on the rear ends of the truck frames and the forward end of the vehicle frame being supported from a point between the truck mechanisms.

4. The combination with a vehicle frame, of a pair of endless, flexible track members upon which the frame is supported, a truck for each track member, each truck comprising anti-friction devices upon the ground run of the track and a rigid frame therefor, springs between the rear ends of the truck frames and the vehicle frame to support the latter, and a single point of support for the front end of the vehicle frame bearing equally on the front ends of both truck frames.

5. The combination with a vehicle frame, of a pair of endless, flexible tracks arranged on opposite sides thereof, a truck for each track composed of anti-friction devices bearing upon the ground run of the track and a rigid frame therefor, one portion of the vehicle frame being supported upon the rear ends of the truck frames, and an equalizing bar connecting the front ends of the truck frames with the front of the main frame.

6. In a vehicle, the combination of a main frame, an endless, flexible track on each side of the main frame, driving and supporting means for the tracks, a truck for each track having rollers bearing on the ground run thereof, said trucks at their forward ends being connected to the main frame at a point located substantially centrally between its sides, and a single load-supporting connection between the rear end of each truck and the main frame, thereby providing a perfect three-point suspension of the main frame upon the flexible tracks.

7. In a vehicle, the combination of a main frame, an endless, flexible track belt on each side of the main frame, a truck within each track belt and having rollers bearing on the ground run thereof, vertically slidable connections between said trucks and the main frame, a front idler and a rear sprocket around which each track belt travels, an equalizer pivotally supporting a portion of the frame on one end of the trucks, and a yielding load supporting connection between the other end of each truck and the main frame.

8. In a self-laying track tractor, a main frame, a pair of self-laying track mechanisms to support said frame, an equalizing bar forming a central support for the front of the main frame, gimbal joints connecting the ends of the equalizing bar and the ends of the self-laying track mechanisms in front of the idlers, vertically slidable guiding connections between the self-laying track mechanisms and the main frame, and resilient supports for said frame at the rear of said track mechanisms.

9. In a self-laying track vehicle, a main frame, a roller truck frame on each side thereof, flexible connections between the front ends of the truck frames and the extreme front end of the main frame, and a yielding, supporting connection between the rear of each truck frame and the main frame.

10. In a vehicle, the combination of a main frame, an endless, flexible track belt on each side of the main frame, rear sprockets and front idlers about which the track belts travel, a truck within each track belt and having rollers bearing on the ground run thereof, vertically slidable connections between said trucks and the main frame, means whereby the weight of one end of the main frame is equally distributed upon each of said trucks at their corresponding ends, and a load supporting connection between the other end of each truck and the main frame.

11. In a self-laying track vehicle, a main frame, a truck at each side thereof, an equalizing bar between the front ends of opposite trucks to support the front of the main frame, connections between the equalizer bar and the trucks to permit the latter to move bodily vertically independently of the frame, and vertically slidable connections between each truck and the main frame at the rear of the equalizer connections to support said trucks transversely.

12. In a self-laying track vehicle, a main frame, a truck frame at each side thereof, flexible connections between the front ends of the truck frames and the main frame, yielding load-supporting connections between the rear of each truck frame and the main frame, and vertically sliding connections between each truck frame and the main frame to support the truck frames transversely.

13. In a vehicle, the combination of a main frame, an endless, flexible track at each side of the frame, a rigid truck frame carrying rollers bearing upon the ground run of each track, springs between the main frame and the rear end of each truck frame, a cross-bar centrally pivoted to the front of the main frame, and connections between said cross-bar and each truck frame to permit bodily, vertical movement of the truck frames independent of the main frame.

14. The combination with a vehicle frame, of a pair of endless, flexible tracks arranged on opposite sides thereof, a truck for each track composed of anti-friction members to engage with the ground run of the track, and a rigid frame therefor, the rear end of the main frame being supported yieldingly upon the rear ends of the truck frames and the front end of the main frame being supported flexibly from a point between the trucks, and means to prevent rocking movement of the trucks.

15. The combination with a vehicle frame, of a pair of endless, flexible tracks upon which the frame is supported, a truck for each track, each truck composed of anti-friction devices to engage the ground run of the track and a rigid frame member, yielding, load-supporting connections between the rear ends of the truck frames and the vehicle frame, and equalizing connections between the front ends of the truck frames and the vehicle frame to permit said truck frames to move bodily vertically independently of the vehicle.

16. In a self-laying track vehicle, a main frame, a roller truck mechanism on each side thereof for supporting said frame, resilient supporting connections between the rear end of each of said truck mechanisms and the main frame, and flexible but non-resilient connections between the front end of each of the truck mechanisms and the main frame.

17. In a self-laying track vehicle, a main frame, a roller truck mechanism on each side thereof for supporting said frame, resilient supporting connections between the rear end of each of said truck mechanisms and the main frame, flexible but non-resilient connections between the front end of each of the truck mechanisms and the main frame, and means to prevent rocking movement of said truck mechanisms.

18. In a self-laying track vehicle, a main frame, a roller truck mechanism on each side thereof to support the main frame, and a three-point supporting connection between the main frame and the truck mechanisms yieldable to permit the trucks to move bodily vertically independently of the main frame.

19. In a self-laying track vehicle, a main frame, driving sprocket wheels at either side journaled directly on the main frame, roller trucks on each side of the frame, an idler sprocket on the front end of each truck, endless self-laying tracks passing around the respective rear driving sprocket and front idlers and yielding connections between the trucks and the main frame in front and to the rear of the front idlers for supporting the load.

20. In a self-laying track vehicle, a main frame, driving sprocket wheels at either side journaled directly on the main frame, roller trucks on each side of the frame, an idler sprocket on the front end of each truck, endless self-laying tracks passing around the respective rear driving sprocket and front idlers, springs between the rear ends of the trucks and the adjacent rear portion of the main frame, and connections between the trucks forward of the front sprockets, said inter-truck connections having a single point of connection with the main frame whereby with the aforesaid springs the said main frame has a three-point support on said trucks.

21. In a self-laying track vehicle, a main frame, driving sprocket wheels at either side journaled directly on the main frame, roller trucks on each side of the frame, an idler sprocket on the front end of each truck, endless self-laying tracks passing around the respective rear driving sprocket and front idlers, springs between the rear ends of the trucks and the adjacent rear portion of the main frame, connections between the trucks forward of the front sprockets, said inter-truck connections having a single point of connection with the main frame whereby with the aforesaid springs the said main frame has a three-point support on said trucks, vertical guide studs on the trucks coöperating with slides on the main frame, and radius rods fulcruming on the rear sprocket shafts and pivoted to the respective trucks.

22. In a vehicle, the combination with a main frame, an endless track structure at each side of the main frame including an idler at the front of said structure and an extension projecting beyond the idler, means connected centrally to the forward end of the main frame and to each of the said extensions for equally distributing the weight of the forward end of the main frame, and a load supporting connection between the main frame and the other end of each of the said track structures.

In testimony whereof I have hereunto set my hand in the presence of two subscribing witnesses.

WILLIAM TURNBULL

Witnesses:
J. G. SMITH,
W. F. FERGUSSON.